United States Patent
Kassegne et al.

(10) Patent No.: US 11,515,099 B2
(45) Date of Patent: Nov. 29, 2022

(54) GRAPHENE AND GLASSY CARBON META-MATERIAL, MICROFABRICATION METHOD, AND ENERGY STORAGE DEVICE

(71) Applicant: San Diego State University Research Foundation, San Diego, CA (US)

(72) Inventors: Samuel K. Kassegne, San Diego, CA (US); Elisa Castagnola, San Diego, CA (US); Surabhi Nimbalkar, San Diego, CA (US)

(73) Assignee: San Diego State University Research Foundation, San Diego, CA (US)

(*) Notice: Subject to any disclaimer, the term of this patent is extended or adjusted under 35 U.S.C. 154(b) by 291 days.

(21) Appl. No.: 16/642,869

(22) PCT Filed: Aug. 30, 2018

(86) PCT No.: PCT/US2018/048956
§ 371 (c)(1),
(2) Date: Feb. 27, 2020

(87) PCT Pub. No.: WO2019/046647
PCT Pub. Date: Mar. 7, 2019

(65) Prior Publication Data
US 2020/0350127 A1     Nov. 5, 2020

Related U.S. Application Data

(60) Provisional application No. 62/552,324, filed on Aug. 30, 2017.

(51) Int. Cl.
*H01M 4/133* (2010.01)
*H01G 11/26* (2013.01)
(Continued)

(52) U.S. Cl.
CPC ............. *H01G 11/26* (2013.01); *H01G 11/32* (2013.01); *H01G 11/86* (2013.01); *H01M 4/133* (2013.01);
(Continued)

(58) Field of Classification Search
CPC .................... H01L 21/02527; H01G 11/26
See application file for complete search history.

(56) References Cited

U.S. PATENT DOCUMENTS

| 9,533,887 B1 | 1/2017 | Polsky |
| 2013/0065034 A1 | 3/2013 | Muramatsu |

(Continued)

FOREIGN PATENT DOCUMENTS

| CN | 10880039 A | * 11/2010 | ............. C01B 31/02 |
| CN | 104402242 | 3/2013 | |

OTHER PUBLICATIONS

Feng, et al., Label-free electrochemical immunosensor for the carcinoembryonic atigen using a glass carbon electrode modified with electrodeposited Prussian Blue, a graphene and carbon nanotube assembly and an antibody immobilized on gold nanoparticles, Microchimica Acta, 2013, pp. 767-774, vol. 180, Issue 9-10.

(Continued)

*Primary Examiner* — Khanh T Nguyen
(74) *Attorney, Agent, or Firm* — Mintz Levin Cohn Ferris Glovsky and Popeo, P.C.

(57) ABSTRACT

A meta-material is disclosed that includes a first layer composed of graphene, and one or more additional layers, each composed of glassy carbon or graphene. A method of producing an engineered material includes depositing a graphene precursor on a substrate, pyrolyzing the graphene precursor to allow the formation of graphene, depositing a glassy carbon precursor the graphene, pyrolyzing to allow the formation of glassy carbon from the glassy carbon (Continued)

precursor, depositing a graphene precursor on the glassy carbon, and pyrolyzing the graphene precursor to allow the formation of graphene.

15 Claims, 12 Drawing Sheets

(51) Int. Cl.
| | |
|---|---|
| *H01G 11/32* | (2013.01) |
| *H01G 11/86* | (2013.01) |
| *H01M 4/36* | (2006.01) |
| *H01M 4/583* | (2010.01) |
| *H01M 4/62* | (2006.01) |
| *H01G 11/52* | (2013.01) |

(52) U.S. Cl.
CPC ........... *H01M 4/366* (2013.01); *H01M 4/583* (2013.01); *H01M 4/62* (2013.01); *H01G 11/52* (2013.01)

(56) References Cited

U.S. PATENT DOCUMENTS

| | | |
|---|---|---|
| 2015/0235847 A1 | 8/2015 | Beasley |
| 2017/0221997 A1 | 8/2017 | Park |

OTHER PUBLICATIONS

United States Patent and Trademark Office, International Search Report and Written Opinion for PCT/US18/48956 dated Dec. 7, 2018, 7 pp.

* cited by examiner

GRAPHENE AND GLASSY CARBON META-MATERIAL, MICROFABRICATION METHOD, AND ENERGY STORAGE DEVICE

CROSS-REFERENCE TO RELATED APPLICATIONS

This application is a national stage filing of International Application No.: PCT/US2018/048956, filed Aug. 30, 2018, entitled "GRAPHENE AND GLASSY CARBON META-MATERIAL, MICROFABRICATION METHOD, AND ENERGY STORAGE DEVICE", which claims priority to U.S. Provisional Patent Application No. 62/552,324, the contents of which are herein incorporated by reference in their entirety.

STATEMENT OF GOVERNMENT SPONSORED SUPPORT

This invention was made Government support under award no. EEC-1028725 awarded by the National Science Foundation (NSF). The government has certain rights in the invention.

TECHNICAL FIELD

The subject matter disclosed herein relates to glassy carbon-based materials, graphene-based materials, and methods of fabrication related to these materials.

BACKGROUND

With the increasing proliferation of energy-hungry devices such as mobile phones and increased adoption of electrical vehicles, research activities in energy storage devices such as batteries and capacitors continue to grow. In addition, the expanding array of implantable devices that interface with the human body and need to remain in vivo for at least 5 years (for example, pace-makers, cochlear implants, and neuro-prosthetics) may require long-lasting energy storage systems.

SUMMARY

In some example embodiments, there is provided an engineered material comprising a first layer composed of graphene, a second layer composed of glassy carbon, a third layer composed of glassy carbon, a fourth layer composed of graphene, and a fifth layer composed of polyimide.

In some variations, one or more of the features disclosed herein including the following features can optionally be included in any feasible combination. The engineered material may further be configured such that the first layer is applied on the second layer. The engineered material may further be configured such that the second layer is applied on the third layer. The engineered material may further be configured such that the third layer is applied on the fourth layer. The engineered material may further be configured such that the fourth layer is applied on the fifth layer. The engineered material may further be configured such that the second layer includes a plurality of glassy carbon layers. The engineered material may further be configured such that the third layer includes a plurality of glassy carbon layers. The engineered material may further be configured to include one or more electrodes of an energy storage device. The engineered material may further be configured such that the one or more electrodes of the energy storage device may be configured to be in contact with an electrolyte. The engineered material may further be configured such that the first layer composed of graphene of the one or more electrodes may be in contact with the electrolyte. The engineered material may further be configured such that the first layer composed of graphene may be chemically bonded with the second layer composed of glassy carbon and the third layer composed of glassy carbon may be chemically bonded with the fourth layer composed of graphene.

In some example embodiments, there is provided an engineered material comprising a first layer composed of graphene, a second layer composed of glassy carbon, and a third layer comprising a silicon substrate.

In some variations, one or more of the features disclosed herein including the following features can optionally be included in any feasible combination. The engineered material may further be configured such that the first layer may be applied on the second layer. The engineered material may further be configured such that the second layer may be applied on the third layer.

In some example embodiments, there is provided a method for fabricating an engineered material including depositing a metal layer on a silicon substrate, depositing a graphene precursor on the metal layer, pyrolyzing to allow the formation of a graphene from the graphene precursor, depositing a glassy carbon precursor on the graphene, and pyrolyzing to allow glassy carbon to form from the glassy carbon precursor.

In some variations, one or more of the features disclosed herein including the following features can optionally be included in any feasible combination. The method may further include yielding an engineered material comprising at least one layer composed of graphene and at least one layer composed of glassy carbon. The method may further include depositing a metal layer on the glassy carbon, depositing a graphene precursor on the metal layer, and pyrolyzing to allow graphene to form from the graphene precursor.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

Figure 1A:
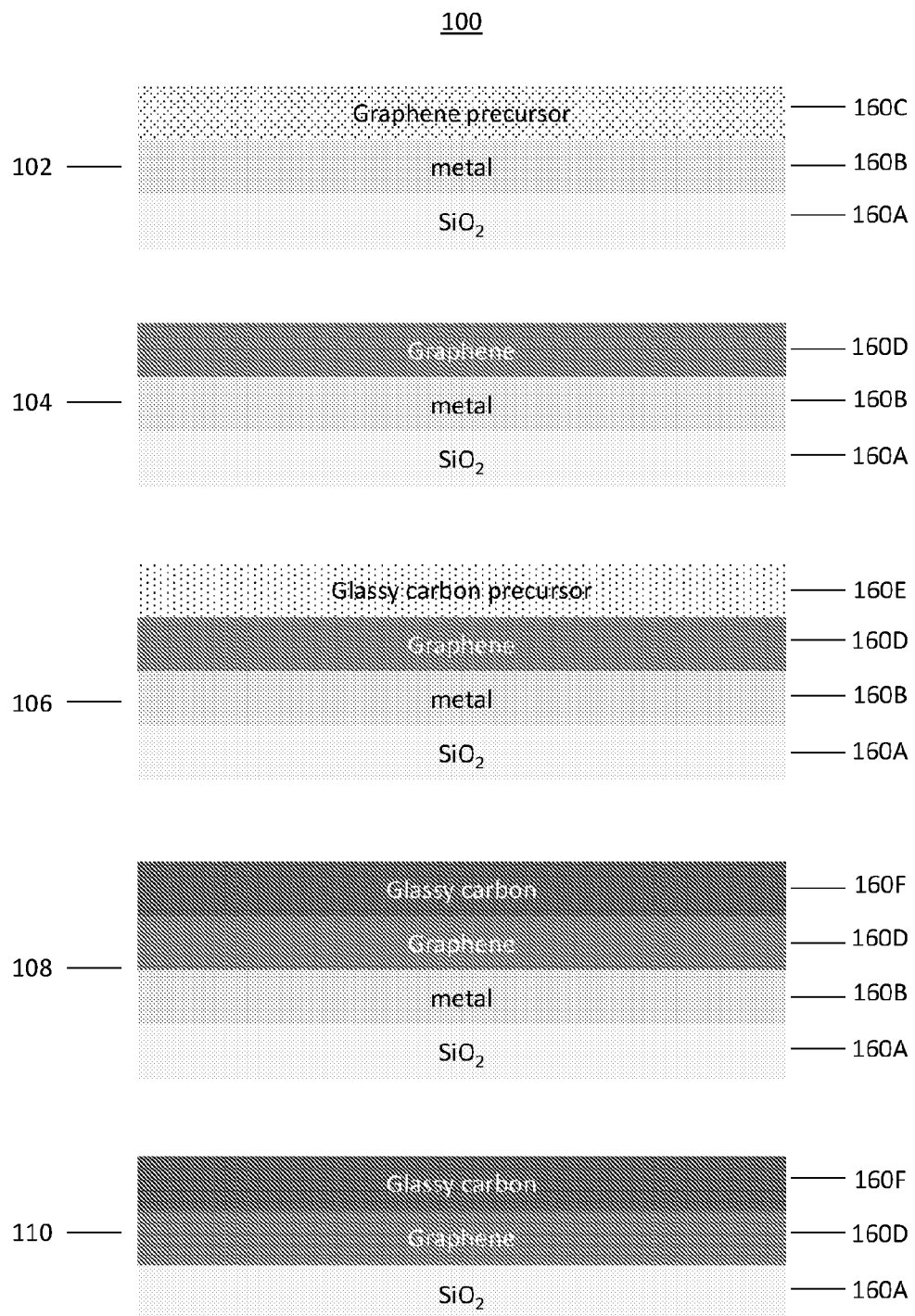
FIGS. 1A-1C depict microfabrication processes for producing a material including graphene and glassy carbon, in accordance with some example embodiments.

In some example embodiments, there may be provided a material including a glassy carbon layer and a graphene layer. This material may also be referred to herein as a graphene-glassy carbon material, graphene-glassy carbon meta-material, or graphene-glassy carbon hybrid material. These materials may be referred to as an "engineered material" to indicate that a fabrication technique is used to make the material.

In some example embodiments, the material may be implemented in a device, such as an electrical device, energy storage device, and/or the like. The use of the graphene-glassy carbon material may, in some implementations, provide improved storage capacity, improved charge/discharge cycle characteristics, and a longer useful lifespan, when compared to other devices made from other materials.

For example, a graphene-glassy carbon material may include one or more layers of glassy carbon and one or more layers of graphene which may be formed using, for example, chemical vapor deposition. The graphene layers and glassy carbon layers may be bound at a molecular level through chemical bonds including, for example, $\pi$-$\pi$ interactions and/or $sp^3$ type bonds in the out-of-plane direction. The graphene-glassy carbon material may include any quantity of layers in any order. In some implementations, the graphene and carbon layers may be alternating layers, one on top of the other.

In the fabrication processes described below, a process known as pyrolysis may be used to allow a material to form from a precursor material. According to example embodiments, using one set of conditions, pyrolysis may be used to allow glassy carbon to form from a glassy carbon precursor material. The glassy carbon precursor material may be composed of, for example, any positive or negative photoresist derived from a polymer. Commercially available glassy carbon precursors may include, for example, SU-8, Shipley photoresist, polyimide, or polymethyl methacrylate (PMMA), or any other epoxy resin material. According to another example, using a different set of conditions, pyroloysis may be used to allow graphene to form from a graphene precursor, such as PMMA or polyparamethyl styrene (PPMS). For each type of material, a temperature, timing, precursor material, ramping conditions, atmosphere, and catalyst are adjusted to allow glassy carbon to form from a glassy carbon precursor, or to allow graphene to form from a graphene precursor. This co-fabrication process may create the conditions needed to form covalent bonds and/or x-x bonds between one or more 2-dimensional graphene layers and one or more 3-dimensional glassy carbon layers. Table 1 below summarizes the pyrolysis conditions used for graphene and glassy carbon, respectively.

TABLE 1

Example pyrolysis conditions used to form glassy carbon or graphene from precursor materials.

| | Material | |
|---|---|---|
| | Glassy Carbon | Graphene |
| Temp | 1000° C. | 1000° C. |
| Time | 2 hours | 10 mins (average) |
| Pre-Cursor | SU8<br>Shipley Polyimide<br>PMMA | PPMS<br>PMMA<br>PS |
| Ramping Conditions | Vacuum to 50 mTorr<br>Ramp over 7 hours to 1000° C.;<br>keep for 2 hours; ramp down to<br>room temp over 2 hours | Vacuum to 50 mTorr<br>1000° C. for 7-20 minutes under 7 Torr.<br>Fast cooled by using magnetic rod. |
| Forming Gas | $N_2$ | $H_2$/Ar<br>$H_2$ (200-600 sccm) & Ar (500 sccm) |
| Catalyst | None | 500 nm Thin-film Nickel/Copper |
| Notes | | $SiO_2$ > 300 nm.<br>https://pubs.acs.org/doi/10.1021/nn202829y<br>Sample in copper enclosure to trap $O_2$ and C left in the system. |

As shown in Table 1, according to some embodiments, pyrolysis may allow glassy carbon to form in a nitrogen atmosphere by heating a glassy carbon precursor by ramping to about 1000° C. over a period of about 7 hours, holding the temperature at about 1000° C. for about 2 hours, then ramping down to room temperature over a period of about 2 hours, although other temperatures, times, ramping conditions, and forming gas may be used as well. For example, the hold time may vary from 3 hours to 12 hours according to some example embodiments. According to example embodiments. Alternatively, glassy carbon may be formed from a glassy carbon precursor using laser pyrolysis.

Also shown in Table 1, pyrolysis may also allow graphene to form from a graphene precursor in a hydrogen/argon atmosphere and in the presence of a catalyst, for example, nickel or copper by heating a graphene precursor material to about 1000° C., holding the temperature at 1000° C. for about 10 minutes, then allowing the material to cool, although other temperatures, times, ramping conditions, forming gases, and catalysts may be used as well. For example, the hold time may range from one second to one hour, according to some example embodiments. Alternatively, graphene may be formed from a graphene precursor using laser pyrolysis.

FIG. 1A depicts an example of a graphene-glassy carbon material microfabrication process 100 using, for example, chemical vapor deposition (CVD).

At 102, there is shown three layers, an $SiO_2$ layer 160A, a metal layer 160B, and a graphene precursor layer 160C. For example, a thin film of metal 160B, such as nickel (Ni), copper (Cu), and/or the like, may be deposited at a thickness of about 300 nanometers (nm) on a $SiO_2$ wafer 160A. A graphene precursor 160C, such as polymethyl methacrylate (PMMA) and/or the like, may then be deposited on the metal layer 160B.

When the layers 160A-C are formed at 102, pyrolysis, for example, as noted above with respect to Table 1, may allow graphene to form as shown at 160D at 104. The graphene layer 160D at 104 may form from the precursor, which in this example is polymethyl methacrylate 160C at 102, although other precursors may be used as well, such as, for example, polyparamethyl styrene (PPMS), polydimethylsiloxane (PDMS), and poly(methyl methacrylate) (PMMA), and other epoxies.

After the formation of the graphene 160D at 104, the chamber used for the pyrolysis may be purged. A glassy carbon precursor, such as, for example, SU-8 (commercially available from MicroChem) may then be deposited as a layer 160E as shown at 106. The glassy carbon precursor may be any material that can be used to form glassy carbon under pyrolysis. SU-8 is a glassy carbon precursor that is also a photoresist that can be used for negative photolithography. Another polymer, AZ-4620 (commercially available from AZ Electronic Materials) is a glassy carbon precursor which is a photoresist that can be used for positive photolithography.

Next, the layers shown at 106 may undergo pyrolysis, for example, as noted above with respect to Table 1. Pyrolysis takes place in a chamber to allow the formation of glassy carbon 160F at 108 from the precursor 160E at 106.

After the glassy carbon 160F at 108 has formed, the metal layer 160B may be etched leaving a material including graphene layer 160D and a glassy carbon layer 160F at 110.

Figure 1B:
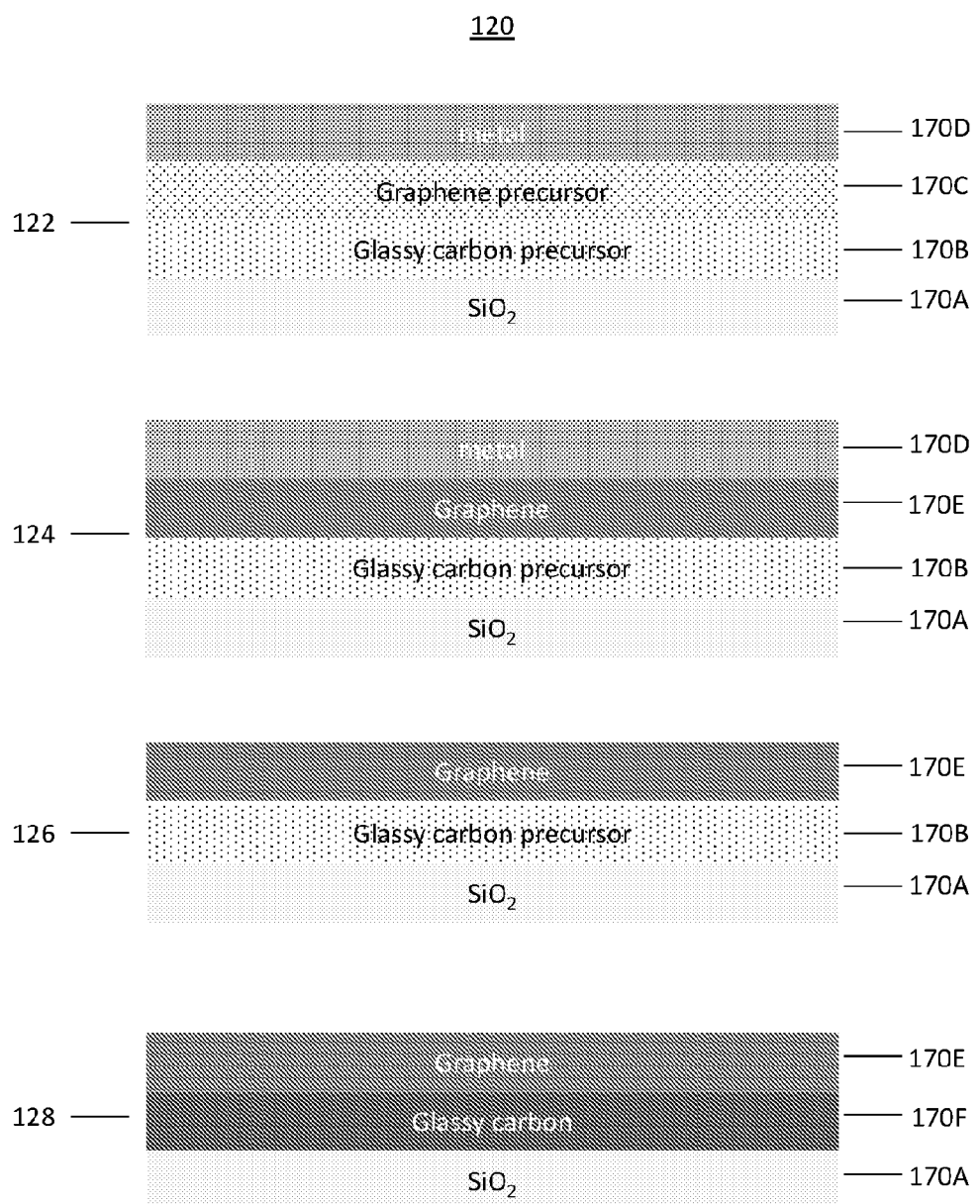

FIG. 1B depicts another example of a process 120 for fabricating a graphene-glassy carbon material. At 122, there is shown four layers comprising a silicon ($SiO_2$) layer 170A, a glassy carbon precursor layer 170B, such as SU-8, a graphene precursor layer 170C, such as polyparamethyl styrene, and a metal layer 170D. In this example, the glassy carbon precursor 170B is deposited on an $SiO_2$ layer or wafer 170A. Next, the graphene precursor 170C (which in this example is polyparamethyl styrene (PPMS)) is deposited. A thin layer of metal, such as nickel, 170D may then be deposited for a thickness of about 300 nm, although other thicknesses may be used as well. Next, pyrolysis, for example, as noted above with respect to Table 1, may allow the formation of graphene 170E at 124 from the graphene precursor 170C at 122, such as polyparamethyl styrene. After pyrolysis is complete, the chamber is purged and the metal layer 170D at 124 is etched. Pyrolysis, for example, as noted above with respect to Table 1, may then allow the formation of glassy carbon 170F at 128 from the glassy carbon precursor 170B at 126. As shown at 128, the graphene layer 170E layered on the glassy carbon layer 170F is realized.

Figure 1C:
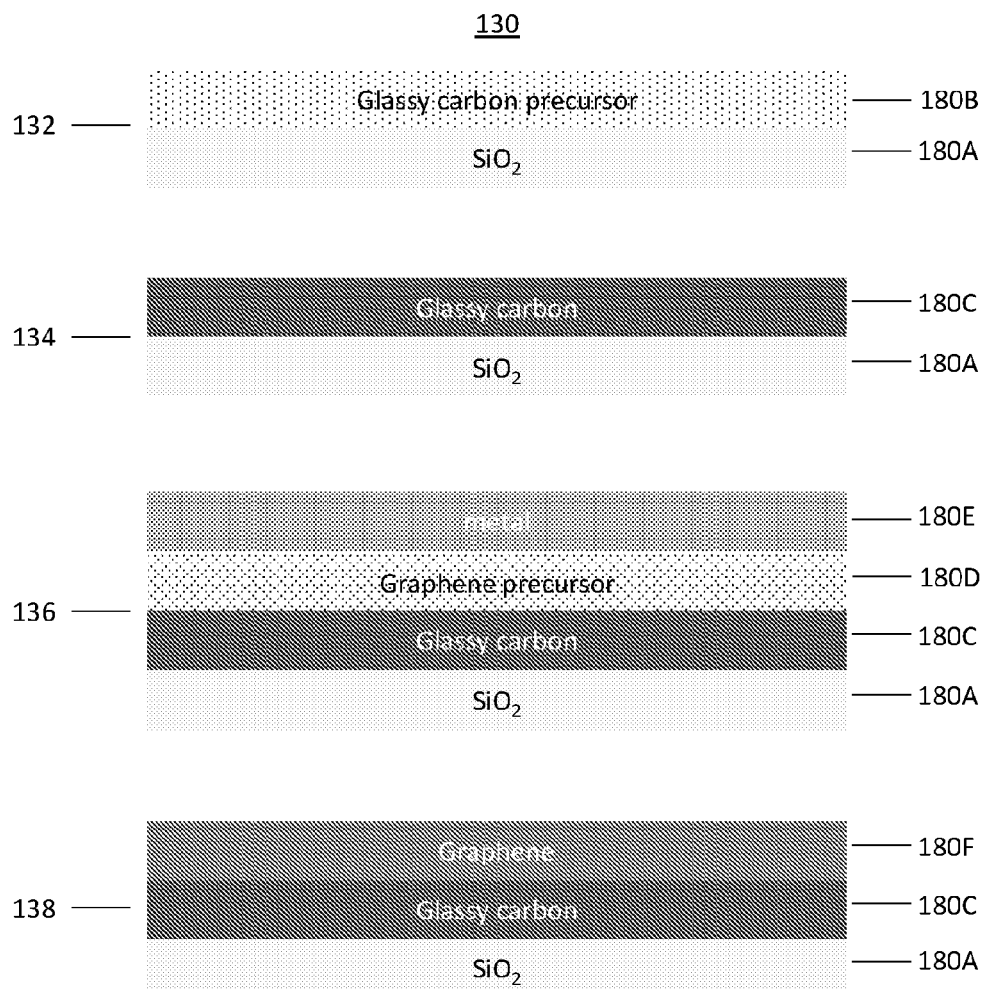

FIG. 1C depicts another example of a process 130 for making a graphene and glassy carbon material. At 132, there is shown a silicon ($SiO_2$) layer or wafer 180A upon which there is applied a glassy carbon precursor 180B, such as SU-8. After pyrolysis, the glassy carbon 180C at 134 may form from the precursor 180B at 132. After the chamber is purged, a thin layer of a graphene precursor 180D at 136, such as polyparamethyl styrene (PPMS), may be deposited on the glassy carbon layer 180C, followed by a thin layer of metal 180E, such as nickel. The metal layer 180E may have a thickness of about 300 nm, although other thicknesses may be implemented as well. Pyrolysis, for example, may then allow formation of graphene 180F at 138 from the graphene precursor 180D at 136. The metal layer 180E at 136 may then be etched, so what remains is the graphene layer 180F and glassy carbon layer 180C on the silicon wafer (or layer) 180A at 138.

Figure 2:
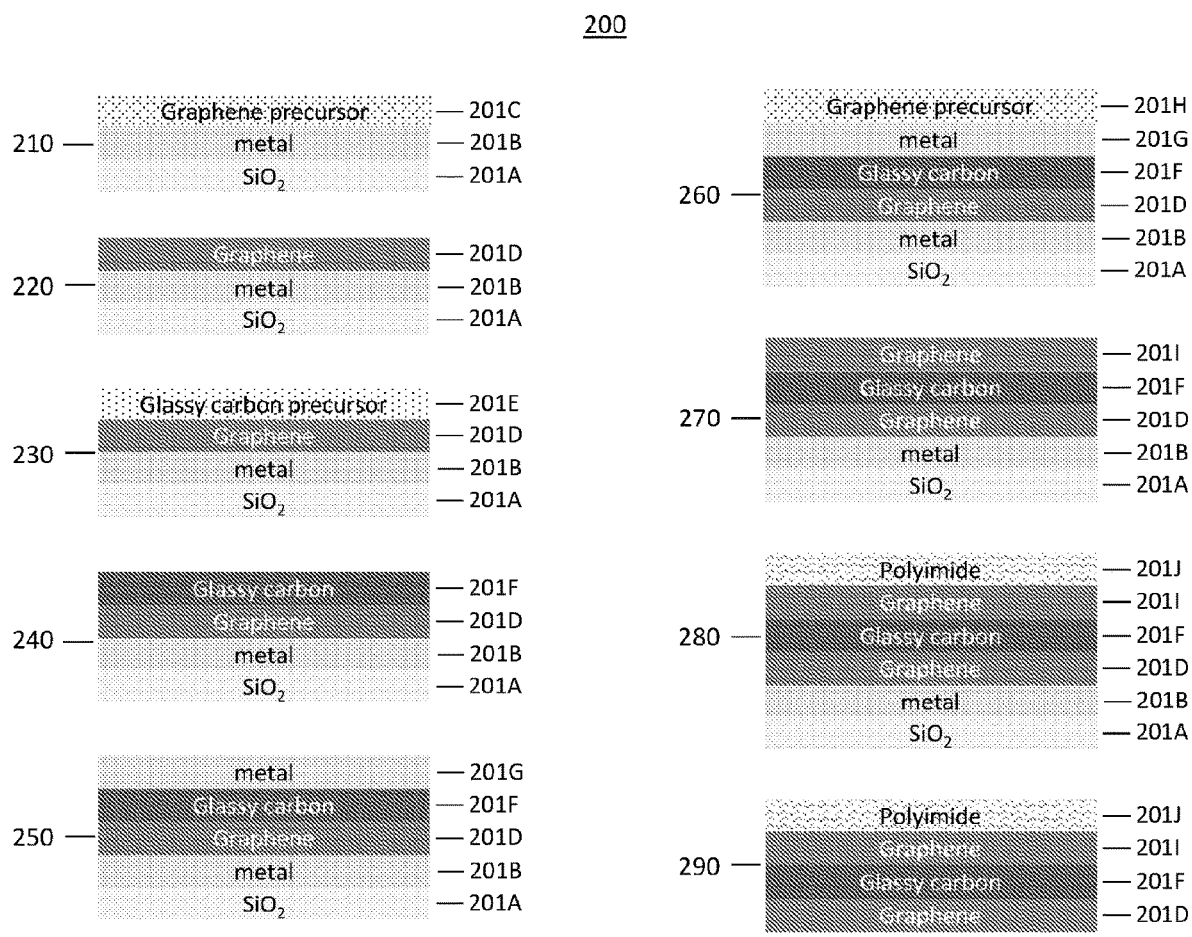
FIG. 2 depicts another example of a microfabrication process for producing a material including graphene and glassy carbon material, in accordance with some example embodiments.

FIG. 2 depicts a further example of a process 200 for making a graphene and glassy carbon material.

The process 200 at 210 to 240 is similar to the process described with respect to FIG. 1A at 102 to 108. At 210, there is shown three layers, an $SiO_2$ layer 201A, a metal layer 201B, and a graphene precursor layer 201C. For example, a thin film of metal 201B, such as nickel (Ni), copper (Cu), and/or the like, may be deposited at a thickness of about 300 nanometers (nm) on a $SiO_2$ wafer 201A. A graphene precursor 201C, such as polymethyl methacrylate (PMMA) and/or the like, may then be deposited on the metal layer 201B.

When layers 201A-C at 210 are formed, pyrolysis, for example, as noted above with respect to Table 1, may allow graphene to form 201D at 220. This graphene layer 201D may form from the precursor 201C at 210, which, in this example is polymethyl methacrylate, although other precursors may be used as well.

After the formation of the graphene 201D, the chamber used for the pyrolysis may be purged. A glassy carbon precursor, such as SU-8, may be applied as a layer 201E as shown at 230.

Next, the glassy carbon precursor at 201E at 230 may undergo pyrolysis, for example, as noted above with respect to Table 1, allowing the formation of glassy carbon at 201F at 240 from the glassy carbon precursor 201E at 230.

According to some examples, one or more glassy carbon layers may be added after the glassy carbon 201F at 240 is formed. For each additional layer: 1) a glassy carbon precursor, such as SU-8, is deposited on the previous glassy carbon layer, for example 201F; and pyrolysis allows the glassy carbon to form from the precursor.

After the desired glassy carbon layers have been added, a second metal layer 201G at 250 may be deposited on the glassy carbon, for example, 201F. For example, a thin film of metal, such as nickel or copper, may be deposited at a thickness of about 300 nm on the glassy carbon, for example, 201F, although other thicknesses may be used.

After the metal layer 201G at 250 has been deposited, a graphene precursor 201H at 260, such as polymethyl methacrylate (PMMA) and/or the like, may then be deposited on the metal layer 201G. Pyrolysis may then allow graphene 201I at 270 to form from the precursor 201H at 260.

After the formation of the graphene 201I at 270, the chamber used for the pyrolysis may be purged and a layer of polyimide 201J at 280 may be deposited on the second graphene layer 201I. After the polyimide 201I at 280 has been deposited, the metal layer 201B at 280 may be etched, resulting in the graphene-glassy carbon material at 290.

Figure 3:
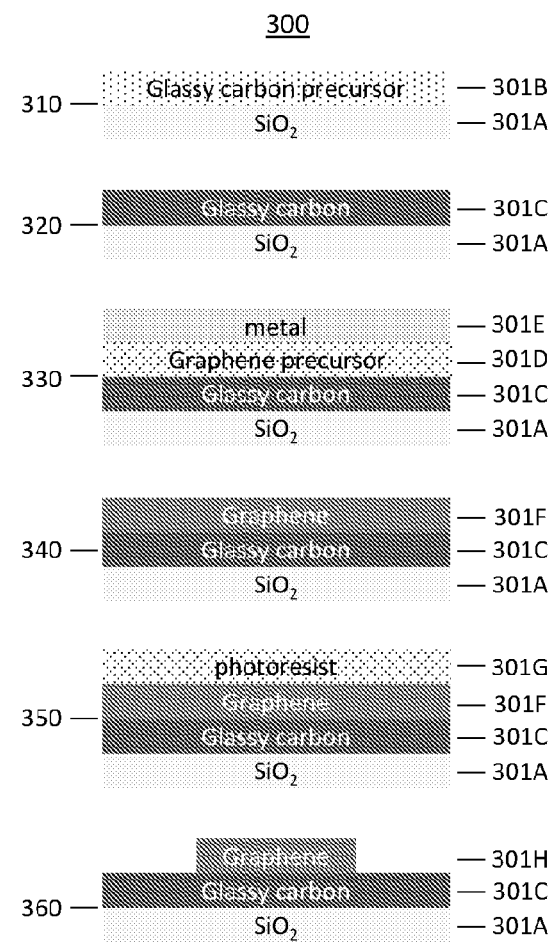
FIG. 3 depicts a microfabrication process for patterning a graphene layer on glassy carbon, in accordance with some example embodiments.

FIG. 3 depicts a graphene-glassy carbon material microfabrication process 300 according to some example embodiments. In the example of FIG. 3, a graphene layer may be patterned on glassy carbon using a graphene on metal (for example, copper) substrate pattern transfer technique.

At 310, there is shown a silicon ($SiO_2$) layer or wafer 301A and a glassy carbon precursor 301B such as SU-8, although other precursors may be used. In this example, the glassy carbon precursor 301B is deposited on the $SiO_2$ substrate 301A. When layers 301A and 301B are formed, pyrolysis, for example, as noted above with respect to Table 1, may allow glassy carbon to form 301C at 320 from the glassy carbon precursor 301B at 310, such as SU-8.

Next, a graphene precursor 301D at 330, such as, for example, polyparamethyl styrene (PPMS) is deposited. A thin layer of metal, such as nickel, 301E may then be deposited for a thickness of about 300 nm, although other thickness may be used as well. Pyrolysis may then allow graphene 301F at 340 to form from the graphene precursor 301D at 330, such as polyparamethyl styrene. The chamber is then purged and the metal layer 301E at 330 is etched. The graphene layer 301F at 340 may now be patterned using photolithography. A photoresist layer 301G at 350, for example polymethyl methylacrylate (PMMA) is deposited. The photolithography is used to expose and develop the photoresist layer 301G, removing a portion of the graphene layer 301H at 360, resulting in a graphene-glassy carbon material which includes a patterned graphene layer 301H at 360.

There are a variety of applications for the graphene-glassy carbon materials disclosed herein. For example, the graphene-glassy carbon material may be used in semiconductor technology, sensors, photovoltaics, or energy storage. In semiconductors, graphene's improved conductivity and zero band-gap along with glassy carbon's capability to form 3D and complex conducting components (for example, 3D electrodes, antennas, and resonators) may offer an improved platform for TTF (thin-film transistors), FET (field effect transistors), OFET, to name a few. The improved electrochemical sensing capability of glassy carbon together with the improved electrical conductivity of graphene may enable improved biochemical sensors with enhanced detection capabilities. In the case of energy storage, graphene layer may provide enhanced electrical conductivity while glassy carbon may enable high charge storage capacity (CSC), when compared to other approaches.

Figure 4A:
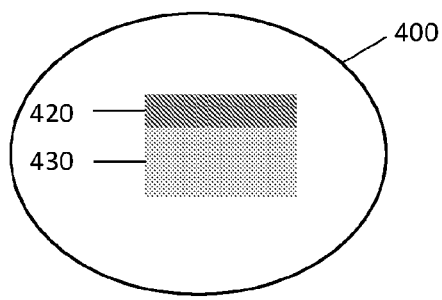
FIGS. 4A-4B depict examples of graphene-glassy carbon materials, in accordance with some example embodiments.
Figure 4B:
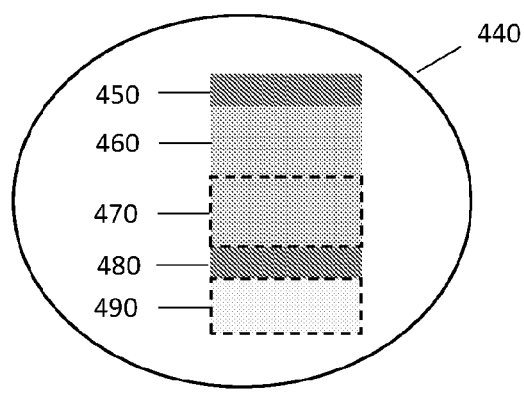

FIG. 4A depicts a graphene-glassy carbon material 400 including a graphene layer 420 and a glassy carbon layer 430. FIG. 4B depicts another example of a graphene-glassy carbon materials 440 having a top graphene layer 450, a bottom graphene layer 480, and a middle layer of glassy carbon material 460. The material 440 may also include one or more additional glassy carbon layers 470 and/or one or more additionally graphene layers 480. Alternatively or additionally, the material 440 may also include a polyimide layer 490.

Figure 5:
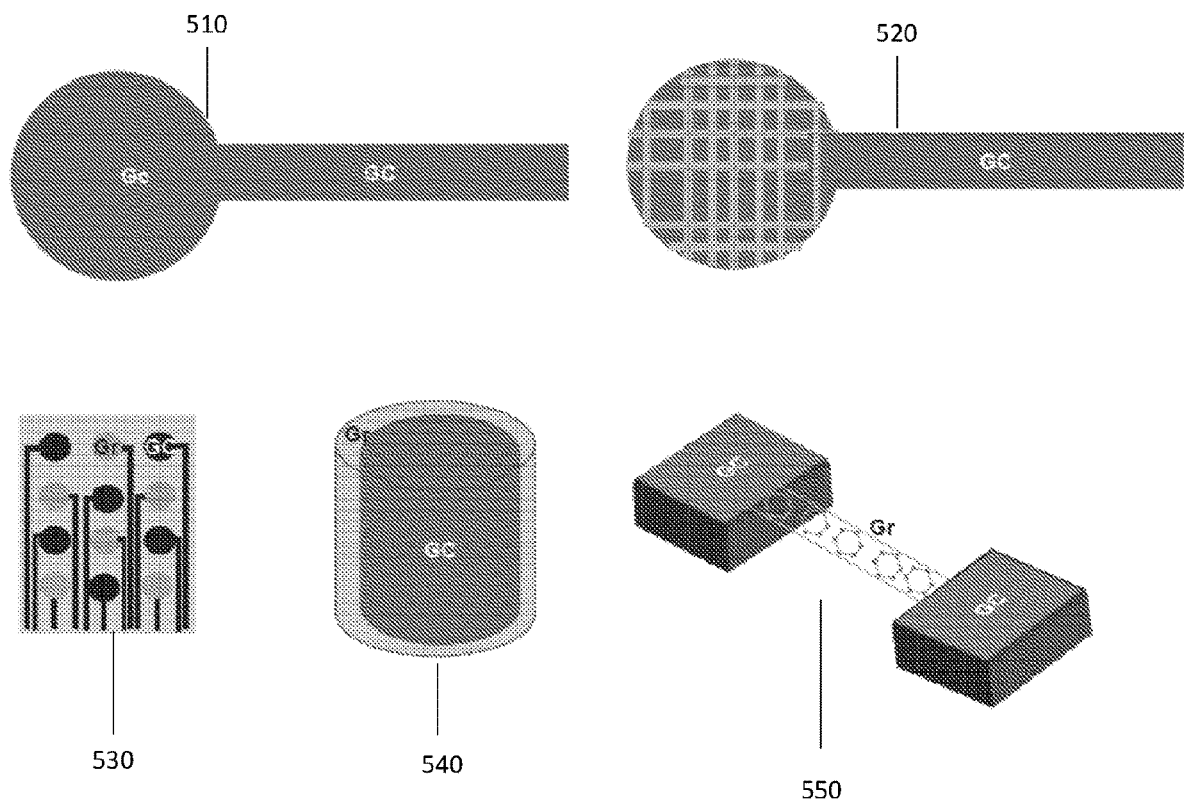
FIG. 5 depicts some examples of implementations including graphene-glassy carbon materials and implementations including glassy carbon materials, in accordance with some example embodiments.

FIG. 5 depicts some examples of system configured using graphene-glassy carbon materials.

Shown are a glassy carbon electrode with a graphene mesh patterned on top of glassy carbon 520, grids of graphene conductors 530, microelectrode array with individual graphene and glassy carbon microelectrodes, 3D electrical/electrochemical cell with graphene layer on top of glassy carbon core 540 which may be used, for example, as a battery, and graphene wire suspended between glassy carbon microstructures 550.

Figure 6:
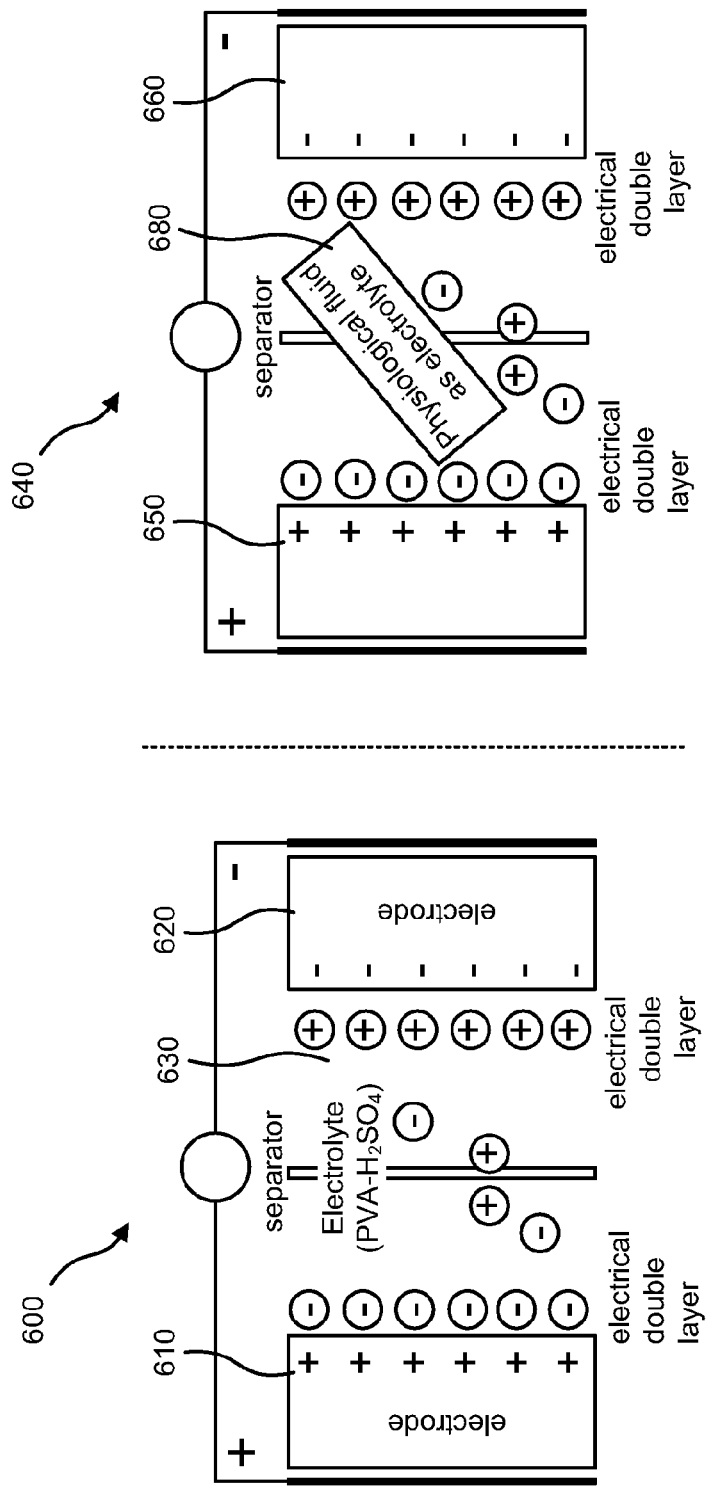
FIG. 6 depicts examples of an energy storage device including graphene-glassy carbon materials, in accordance with some example embodiments.

FIG. 6 depicts energy storage devices 600 and 640 including the graphene-glassy carbon material at electrodes 610, 620, 650, and 660. The energy storage device may be a device such as a battery, a capacitor, a super capacitor and/or the like. The energy storage device 600 includes electrodes 610, 620 comprised from a graphene-glassy carbon material as disclosed herein. The electrolyte 630 may include, for example, a polymeric material such as PVA-H2SO4, and/or the like. The energy storage device 640 including graphene-glassy carbon material electrodes 650, 660 may include an electrolyte which includes physiological fluids 680 to enable use in, for example, an implantable medical device (e.g., pacemakers, cochlear implants, deep brain neurostimulators, and/or the like). Physiological fluids included in the electrolyte 680 may be any fluid found in the body of a patient or test subject, and may include, for example, extracellular fluid, interstitial fluid, and/or intracellular fluid.

Figure 7:
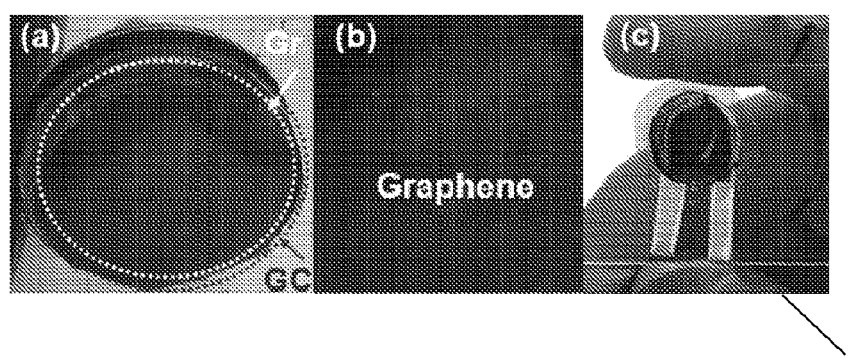
FIG. 7 depicts an example of an energy storage device implemented using graphene-glassy carbon materials, in accordance with some example embodiments.

FIG. 7 depicts a sample energy storage device 700 implemented as described herein using the graphene-glassy carbon material. The sample energy storage device was subsequently characterized through Raman and Fourier-transform infrared (FTIR) spectroscopy.

Figure 8:
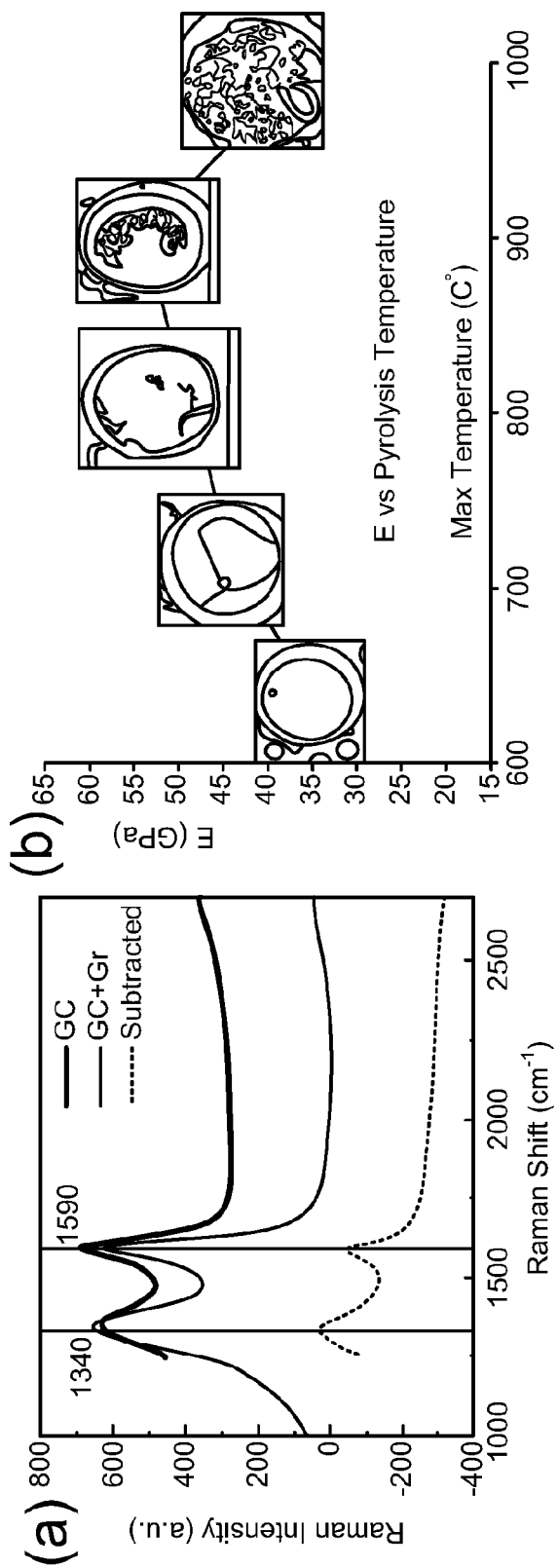
FIG. 8 depicts Raman and FTIR spectroscopy results performed on an example energy storage device, in accordance with some example embodiments.

FIG. 8 depicts the results of the Raman and FTIR spectroscopy performed on a sample of a graphene-glassy carbon material implemented according to example embodiments. The Raman spectroscopy demonstrates the presence of graphene on top of the glassy carbon layer.

Figure 9:
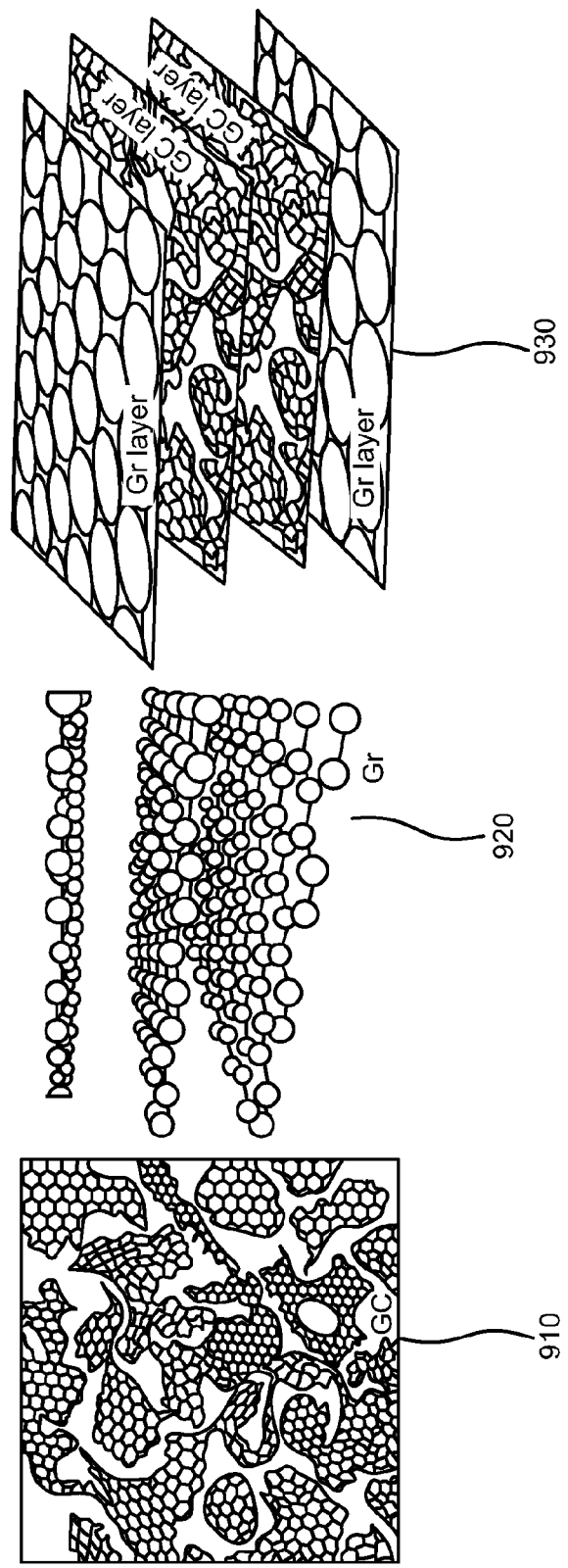
FIG. 9 depicts examples of structures, in accordance with some example embodiments.

FIG. 9 at 910 depicts the structure of glassy carbon, which consists of graphene-like layers formed into closely packed 3D ribbons which are bound to each other by $sp^3$ bonds. This structure of glassy carbon allows a natural link to layers of graphene through 7C-7C bonds. FIG. 9 at 920 depicts the structure of graphene. FIG. 9 at 930 depicts the structure of a graphene/GCn/graphene material. The subscript 'n' indicates the number of layers of glassy carbon in the graphene-glassy carbon material.

Figure 10:
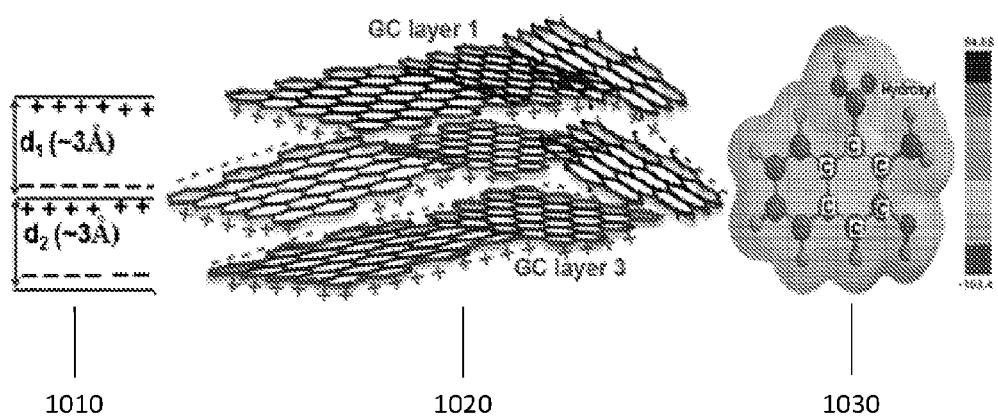
FIG. 10 depicts charge storage capabilities of materials, in accordance with some example embodiments.

As shown in FIG. 10 at 1010 and 1020, each graphene-like ribbon found in the glassy carbon is separated by a very small distance, on the order of about 3 Angstroms from the next layer through $sp^3$ hybridization. This may form an efficient capacitor between each layer of ribbons, giving glassy carbon a high charge storage capacity. The electrostatic potential of glassy carbon is depicted at 1030 with functional groups such as hydroxyls conducive for bonds.

These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. For example, the instructions for manufacturing the material may be implemented in program code and taped out to enable manufacturing at other locations. The computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. The use of a first "A", a second "A", a third "A", and so forth does not specify a particular order of the "A" items but is instead for purposes of antecedent basis. Other implementations may be within the scope of the following claims.

What is claimed is:

1. An engineered material comprising:
    a first layer comprising graphene;
    a second layer comprising glassy carbon;
    a third layer comprising glassy carbon;
    a fourth layer comprising graphene; and
    a fifth layer comprising polyimide.

2. The engineered material of claim 1, wherein the first layer is a top layer applied on the second layer.

3. The engineered material of claim 2, wherein the second layer is applied on the third layer.

4. The engineered material of claim 3, wherein the third layer is applied on the fourth layer.

5. The engineered material of claim 3, wherein the fourth layer is applied on the fifth layer.

6. The engineered material of claim 1, wherein the second layer comprises a plurality of glassy carbon layers.

7. The engineered material of claim 1, wherein the third layer comprises a plurality of glassy carbon layers.

8. The engineered material of claim 1, wherein the engineered material is configured as one or more electrodes of an energy storage device.

9. The engineered material of claim 8, wherein the energy storage device comprises a capacitor and/or super-capacitor.

10. The engineered material of claim 9, wherein the first layer comprising graphene of the one or more electrodes is in contact with the electrolyte.

11. The engineered material of claim 8, wherein the one or more electrodes are in contact with an electrolyte.

12. The engineered material of claim 1, wherein the first layer comprising graphene is chemically bonded with the second layer comprising glassy carbon, and wherein the third layer comprising glassy carbon is chemically bonded with the fourth layer comprising graphene.

13. A method for fabricating an engineered material comprising graphene and glassy carbon, the method comprising:
    depositing a first metal layer on a silicon wafer;
    depositing a first graphene precursor on the first metal layer;
    pyrolyzing the first graphene precursor layer to allow the formation of a first graphene layer;
    depositing a glassy carbon precursor layer on the first graphene layer;
    pyrolyzing the glassy carbon precursor layer to allow the formation of a glassy carbon layer; and
    etching to remove the first metal layer.

14. The method of claim 13, wherein the method yields the engineered material comprising at least one layer composed of graphene and at least one layer composed of glassy carbon.

15. The method of claim 14, further comprising:
    depositing a second metal layer on the glassy carbon layer;
    depositing a second graphene precursor layer on the second metal layer; and
    pyrolyzing to allow the formation of a second graphene layer.

* * * * *

UNITED STATES PATENT AND TRADEMARK OFFICE
CERTIFICATE OF CORRECTION

| | | |
|---|---|---|
| PATENT NO. | : 11,515,099 B2 | |
| APPLICATION NO. | : 16/642869 | |
| DATED | : November 29, 2022 | |
| INVENTOR(S) | : Samuel K. Kassegne et al. | |

It is certified that error appears in the above-identified patent and that said Letters Patent is hereby corrected as shown below:

In the Specification

Column 1, Line 20-22, delete the text beginning with "Government" and ending with "(NSF)" and insert the following --with government support under EEC-1028725 awarded by the National Science Foundation.--

Signed and Sealed this
Third Day of October, 2023

Katherine Kelly Vidal
*Director of the United States Patent and Trademark Office*